(12) United States Patent
Murdock

(10) Patent No.: US 7,963,213 B1
(45) Date of Patent: Jun. 21, 2011

(54) BEVERAGE MAKING APPARATUS

(76) Inventor: Michael Caulter Murdock, Santa Ana, CA (US)

( * ) Notice: Subject to any disclaimer, the term of this patent is extended or adjusted under 35 U.S.C. 154(b) by 778 days.

(21) Appl. No.: 11/955,364

(22) Filed: Dec. 12, 2007

Related U.S. Application Data

(60) Provisional application No. 60/874,219, filed on Dec. 12, 2006.

(51) Int. Cl.
*A47J 31/00* (2006.01)
(52) U.S. Cl. .......................... 99/323.1; 99/323.3; 99/322
(58) Field of Classification Search ................ 99/323.1, 99/323.3, 322, 470; 222/146.1, 146.2, 146.6; 220/592.16, 592.28, 592.03, 592.01
See application file for complete search history.

(56) References Cited

U.S. PATENT DOCUMENTS

| 814,460 | A | * | 3/1906 | Kruckewitt | 99/322 |
| 1,033,136 | A | * | 7/1912 | Wennersten | 220/203.04 |
| 4,754,698 | A | * | 7/1988 | Naish | 99/275 |
| 5,365,830 | A | * | 11/1994 | MacLennan et al. | 99/276 |
| 6,032,571 | A | * | 3/2000 | Brous et al. | 99/277.2 |
| 6,629,490 | B1 | * | 10/2003 | Lu et al. | 99/276 |
| 6,931,984 | B2 | * | 8/2005 | Lassota | 99/280 |

* cited by examiner

*Primary Examiner* — Reginald L Alexander
(74) *Attorney, Agent, or Firm* — Michael D. Eisenberg

(57) ABSTRACT

An apparatus for preparing a beverage is provided. The apparatus may comprise a frame having a base, a top, front and back sides, and right and left sides; a beverage chamber disposed inside the frame; a heating element connected to the frame; a cooling element disposed inside the frame between the beverage chamber and the frame; a gas valve connected to the frame and penetrating the frame to extend into the beverage chamber; and a spigot connected to the frame, the spigot having a channel contiguous with the beverage chamber for emptying the contents of the chamber.

20 Claims, 12 Drawing Sheets

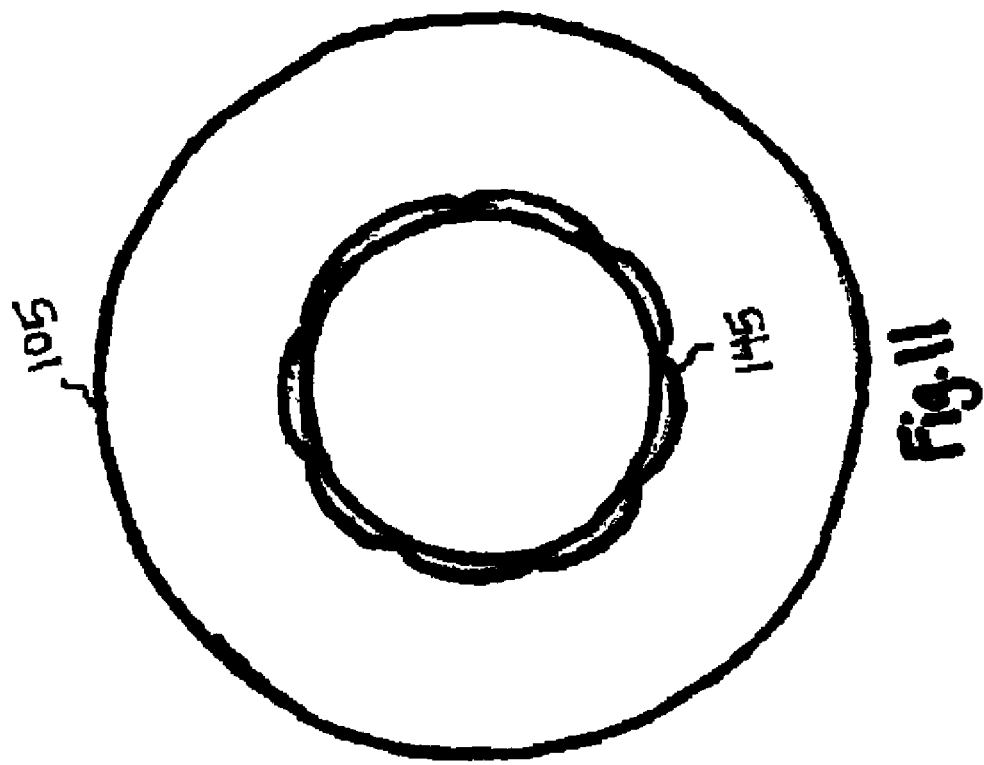
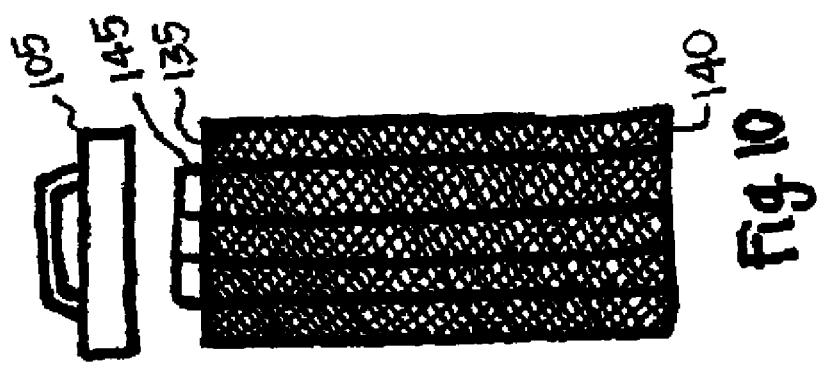

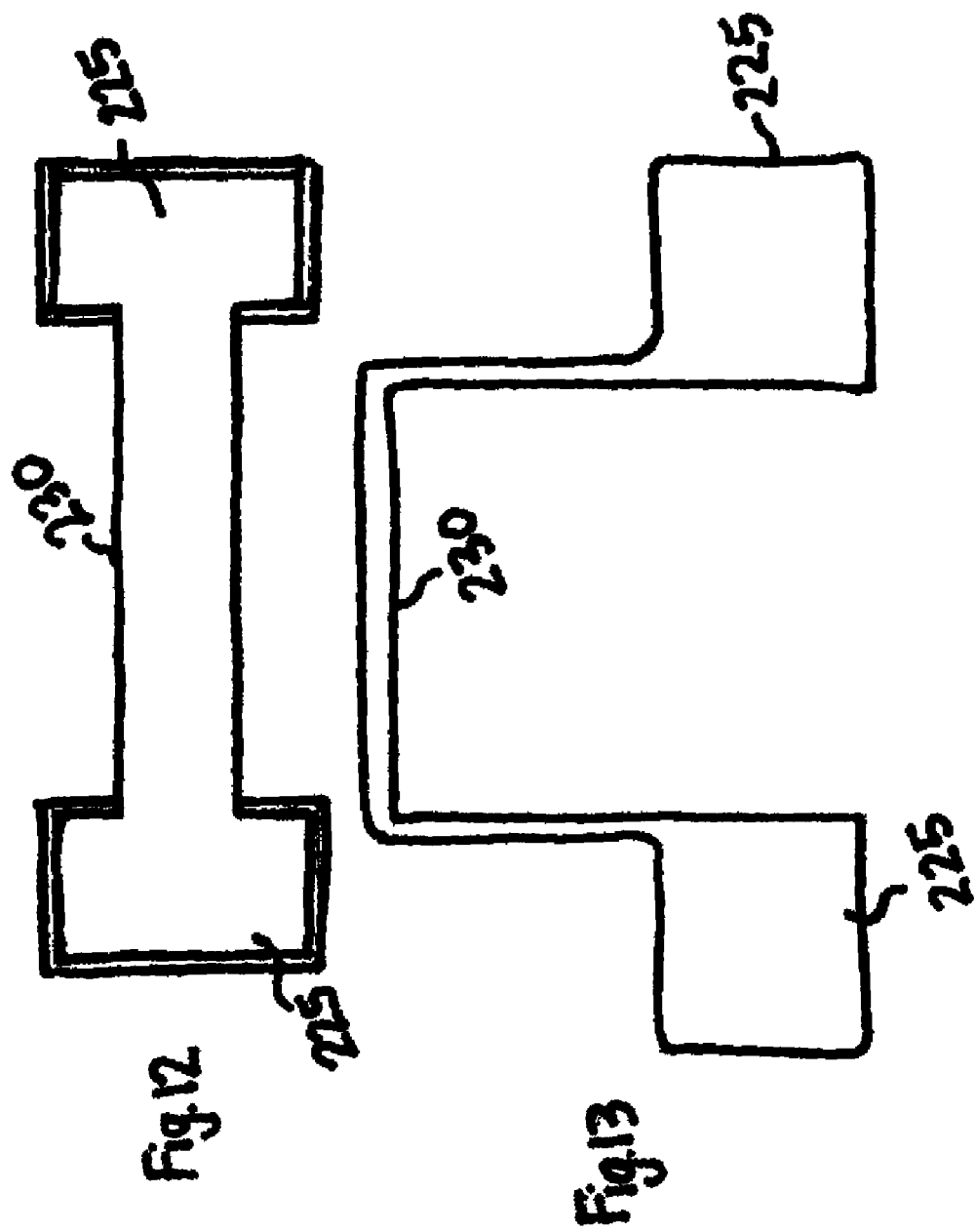

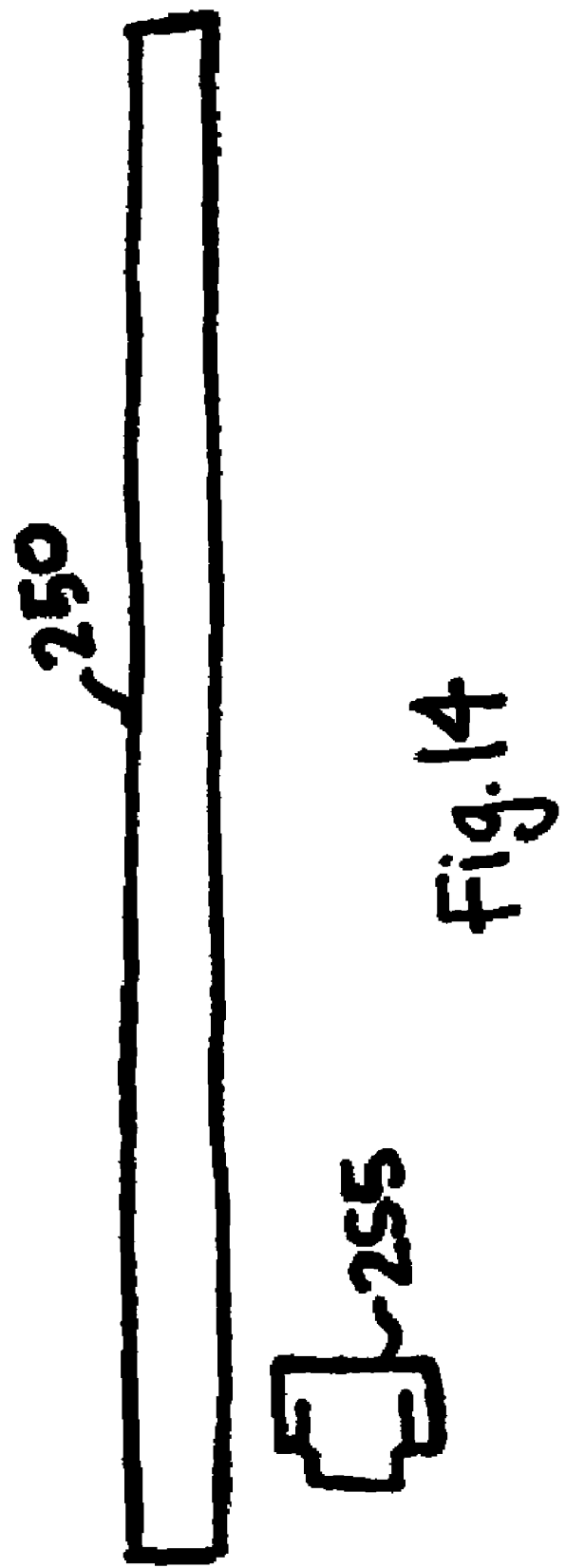

BEVERAGE MAKING APPARATUS

CROSS-REFERENCES TO RELATED APPLICATIONS

This application claims priority from U.S. Provisional Application Ser. No. 60/874,219 filed Dec. 12, 2006, which is hereby incorporated herein by reference in its entirety.

TECHNICAL FIELD

The present invention relates to beverage making apparatuses and, more particularly, some embodiments relate to a beer or wine brewing device for creating homemade beer, as well as other carbonated beverages or alcoholic beverages.

BACKGROUND OF THE INVENTION

A conventional way to brew beer at home involves the use of labor-intensive apparatus and techniques passed down through the years. Because of the long tradition of home beer brewing, a considerable art has attached to this activity. Generally, this art of home-brewing beer is an adaptation or extrapolation from large-scale brewing techniques. Traditional brewing of beer at home requires considerable dedication and care from the home brewer, especially in view of the tradition attached with the making of good beers at home. This brewing process requires tedious preparation and assembly of the equipment coupled with precise addition of ingredients under carefully controlled conditions. Such rigors are not easily followed by the average home brewing hobbyist, and this can lead to the production of batches of beer with inconsistent and poor quality, spoiled beer, and other failures of the process.

Beer, ale, and other fermented malted grain alcoholic beverages generally consist of four ingredients: water; fermentable sugars (usually derived from malt or malt extracts); hops for flavor, bitterness, and aroma; and yeast (both for flavor and for the fermentation used first to produce alcoholic content, and which is then used also to provide carbonation in bottle-conditioned beer). In this disclosure, the term "beer" is used inclusively to encompass all of these beverages. In some cases, part of the sugars and carbohydrates consumed by the yeast in the fermentation process are acquired by steeping grain in hot water.

The traditional home brewer may use a wort pot, and bucket fermentor with a gasket equipped lid and a fitting for a water-filled fermentation lock. Also used in the process are a bottling bucket, bottling siphon, hydrometer, wort chiller, bucket brush, and sanitizing chemicals so that all the apparatus can be sanitized before use. A starter of a good live brewer's yeast is also necessary. Careful sanitizing and particular procedures carried out in a particular order are generally necessary in order to make good beer, and to prevent spoiled beer. Spoiling of beer happens, for example, when microbes from the environment get into the wort and grow instead of or along with the working yeast (i.e., the "wort" is the weak solution of sugars and organic ingredients from grains, malt, and hops which will become beer after a first fermentation at ambient pressure to produce alcohol, and a second fermentation in a pressure vessel [i.e., in a beer bottle] to provided carbonation). Understandably, wort is both a fermentation medium, and also provides a fertile culture medium for undesirable microbes from the environment.

In the brewing of beer at home, after all the equipment is sanitized the brewer does not touch certain parts of the equipment, and is even cautioned against breathing on the equipment. The actual process of home brewing beer involves making and fermenting "wort". The usual home brew recipe makes about five gallons of beer. The wort is made, for example, by putting five gallons of water into a stock pot, adding malt or malt extract to the water, crushing grain, placing the grain in a fabric bag (a muslin bag, for example), and adding this bagged grain to the hot water, heating the water and grain bag toward but short of a boil, holding the water at about 160 degrees F. to steep the grains for a period of time, increasing the heat and removing the grain bag before the water boils, and then bringing the water to a boil.

After the water reaches a boil, a liquid malt extract is added and stirred into the mixture. Spray-dried malt extract may also be added. Again the wort is brought to a full boil, a first addition of hops (bittering hops) is carried out, and the wort is held at a boil for 60 minutes, with care being exercised to not boil the pot over. Next, a second addition of hops (flavoring hops) is added. In the last 5 minutes of this boil, Irish moss may be added to clarify the wort. The last addition of hops (aroma hops) is added and heating of the wort is stopped. A wort chiller or ice packing of the stock pot is used to cool the wort as quickly as possible to about 90 degrees F. or less.

Next, the yeast is added to the bucket fermentor. Various strains of yeast are used to modify the flavor of the beer. This yeast is added to the bottom of a fermenting bucket, and the wort is poured carefully from the stock pot into the bucket fermentor using care to maintain the pre-sanitized condition of the vessels. The temperature of the yeast and wort should not differ by more than 15 degrees F, in order to avoid shocking or killing the yeast. Next, the fermentor is capped, and water is added to the fermentation lock to allow carbon dioxide produced by fermentation to escape, while preventing the introduction of ambient air and microbes. The total time requirement for the home brewer to this stage of the process is from a minimum of about 2 hours and 40 minutes to as much as 8 hours of time.

After a number of days have passed (usually 8 to 10 days) and the bubbling at the fermentation lock has ceased, the bucket fermentor is opened and the hydrometer is used to check for an appropriately low sugar level and desired level of alcohol. Next, priming sugar is added to a bottling bucket, and the wort is poured into this bottling bucket without allowing aeration. Care is taken to see that the treppe (i.e., the residue and fermentation by-products in the bottom of the fermentation bucket) does not pour from the fermentation bucket into the bottling bucket. The wort and sugar are carefully stirred, and the bottling siphon is started. With the bottling siphon the sugar-primed wort is transferred to bottles, filling them from the bottom to the top, again to prevent aeration. Some bottling buckets have a spout to which a filling tube is connected, so this arrangement avoids the need to start a siphon. The wort is transferred in this case from the bottling bucket to the bottles by gravity. Next, the bottles are capped and aged. After five weeks or so, if everything was done properly, the home brewer hopes to have good tasty home-brewed beer. However, failures do occur.

In view of the mess and difficulties, excessive time and labor requirements, and frequent failures of traditional home beer brewing methods, attempts in the past have been made to ease the burden and improve the product. For example, a conventional home brewing apparatus is seen that appears to depict and describe a home beer brewing device. Generally, this device seeks to achieve a closed, single-vessel brewing process which protects the fermentable product from oxidation and microbial contamination. Chemical sanitizing of the apparatus is still required. The device also seeks to practice a cold/pressurized fermentation. This device requires pre-formulated mixes. Also, many of the traditional beer brewing processes are not possible with the "beer barrel". For example, hot-wort grain steeping is not possible with this product. Also, the addition of bittering hops or finishing hops at a particular time in the brewing process is not possible.

Accordingly, a need remains for a home beer brewing device in order to overcome the above-noted shortcomings. The present invention satisfies such a need by providing a device that is convenient and easy to use, is durable in design, is versatile in its applications, and provides users with a more simplified, yet extremely effective, means of creating their own beer and other alcoholic and non-alcoholic carbonated beverages, right in the comforts of home. By eliminating the need to go to bars or to grocery stores and liquor stores spending countless dollars on pre-made alcoholic and non-alcoholic beverages, the present invention allows the industrious do-it-yourselfers a handy tool in creating their own perfect liquid refreshment. Moreover, the device eradicates the hassles inherent in common forms of home brewing. By concentrating a heating and cooling element into an electrical device specially designed for beverage creation, the device saves countless steps in the process, not to mention freeing up needed space on stoves and in refrigerators. In addition, this centralized device proves cost effective for the home brewing process, as additional equipment such as siphoning hoses and bottling implements would be provided with the product.

BRIEF SUMMARY OF EMBODIMENTS OF THE INVENTION

According to one embodiment of the invention, an apparatus for preparing a beverage is provided. The apparatus may have a frame having a base, a top, front and back sides, and right and left sides. A beverage chamber is disposed inside the frame. A heating element is connected to the frame. A cooling element is disposed inside the frame between the beverage chamber and the frame. A gas valve is connected to the frame and penetrates the frame to extend into the beverage chamber. A is spigot connected to the frame. The spigot has a channel contiguous with the beverage chamber for emptying the contents of the chamber.

In another embodiment, the cooling element is disposed in the right and left sides and the heating element is disposed in base. The spigot and gas valve are connected to the front side of the frame.

In a further embodiment, the gas valve is configured to receive and connect to a $CO_2$ bulb. The gas valve has a switch for toggling between an open position for permitting $CO_2$ to enter the beverage chamber and a closed position to maintain the $CO_2$ in the bulb. In one embodiment, the toggle switch is biased in a closed position.

In still another embodiment, the apparatus has a steeping chamber sized and shaped to fit inside the beverage chamber. In yet a further embodiment, the steeping chamber has sides comprised of wire mesh and a lid for sealing a closeable opening disposed in the top of the apparatus, the closeable opening leading into the beverage chamber and the lid sized and shaped to close off the first closeable opening.

In another embodiment, the apparatus has a first closeable opening disposed in the front, the first closeable opening leading into the beverage chamber. A cover sized and shaped to hermetically seal the first closeable opening is provided wherein the gas valve and the spigot are disposed in the cover.

In a further embodiment, the apparatus has a second closeable opening disposed in the top, the second closeable opening leading into the beverage chamber and a second cover sized and shaped to close off the second closeable opening.

In still another embodiment, the apparatus has a gas pressure gauge disposed on the first closeable cover.

In yet a further embodiment, the apparatus has a pressure release valve disposed in the frame and contiguous with the beverage chamber for permitting the escape of gas from the beverage chamber when the valve is in an open position. The apparatus has and a pressure release toggle disposed in the frame. The pressure release toggle may be configured to open the pressure release valve when operated on by a user. The pressure release valve and the pressure release toggle may be biased in a closed position.

In another embodiment, the apparatus has a heat shield disposed in a side of the frame.

In a further embodiment, the heating element is removable from the frame.

In still another embodiment, the apparatus has a dispensing tube connected to the spout and a float connected to an end of the dispensing tube. A screen is disposed in the bottom of the beverage chamber. The screen may be configured to screen the float from the bottom of the beverage chamber.

In yet a further embodiment, the apparatus may have a controller in electrical communication with the heating element and the cooling element. A temperature sensor may be disposed in a side wall. The temperature sensor is in electrical communication with the controller. The controller may be configured to turn off the heating and cooling elements when the temperature sensor reaches a critical temperature.

In another embodiment, the apparatus has a liquid sensor disposed inside the beverage chamber.

In a further embodiment, the apparatus has a display and control panel connected to the outside of the frame.

In still another embodiment, the apparatus is configured to maintain a liquid in the beverage chamber at a predetermined temperature in response to an action by an operator of the apparatus.

In yet a further embodiment, the apparatus has a beverage caddie sized and chapped to fit over the frame.

In another embodiment, the apparatus for preparing a beverage has: a frame having a base, a top, front and back sides, and right and left sides; a beverage chamber disposed inside the frame; a heating element connected to the frame; a cooling element disposed inside the frame between the beverage chamber and the frame; and a spigot connected to the frame, the spigot having a channel contiguous with the beverage chamber for emptying the contents of the chamber.

In still a further embodiment, the apparatus for preparing a beverage may comprise: a frame having a base, a top, front and back sides, and right and left sides; a beverage chamber disposed inside the frame; a heating element removably disposed in the base of the frame; a cooling element disposed inside the frame adjacent the beverage chamber and the frame; a first closeable opening disposed in the top, the first closeable opening leading into the beverage chamber and a first cover sized and shaped to close off the first closeable opening; a second closeable opening disposed in the front, the second closeable opening leading into the beverage chamber; a first cover sized and shaped to hermetically seal the first closeable opening; a gas valve disposed in the first cover and penetrating the cover to extend into the beverage chamber; and a spigot disposed in the first cover, the spigot having a channel contiguous with the beverage chamber for emptying the contents of the chamber.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 10 is an exploded view of a steeping chamber for the apparatus for preparing beverages;

FIG. 11 is a bottom view of a second cover configured to connect to the steeping chamber;

FIG. 12 is a top view of a beverage caddie for the apparatus for preparing beverages;

FIG. 13 is a side view of a beverage caddie for the apparatus for preparing beverages; and FIG. 14 is a top view of bottling tube and dispensing cap for the apparatus for preparing beverages.

Figure 1:
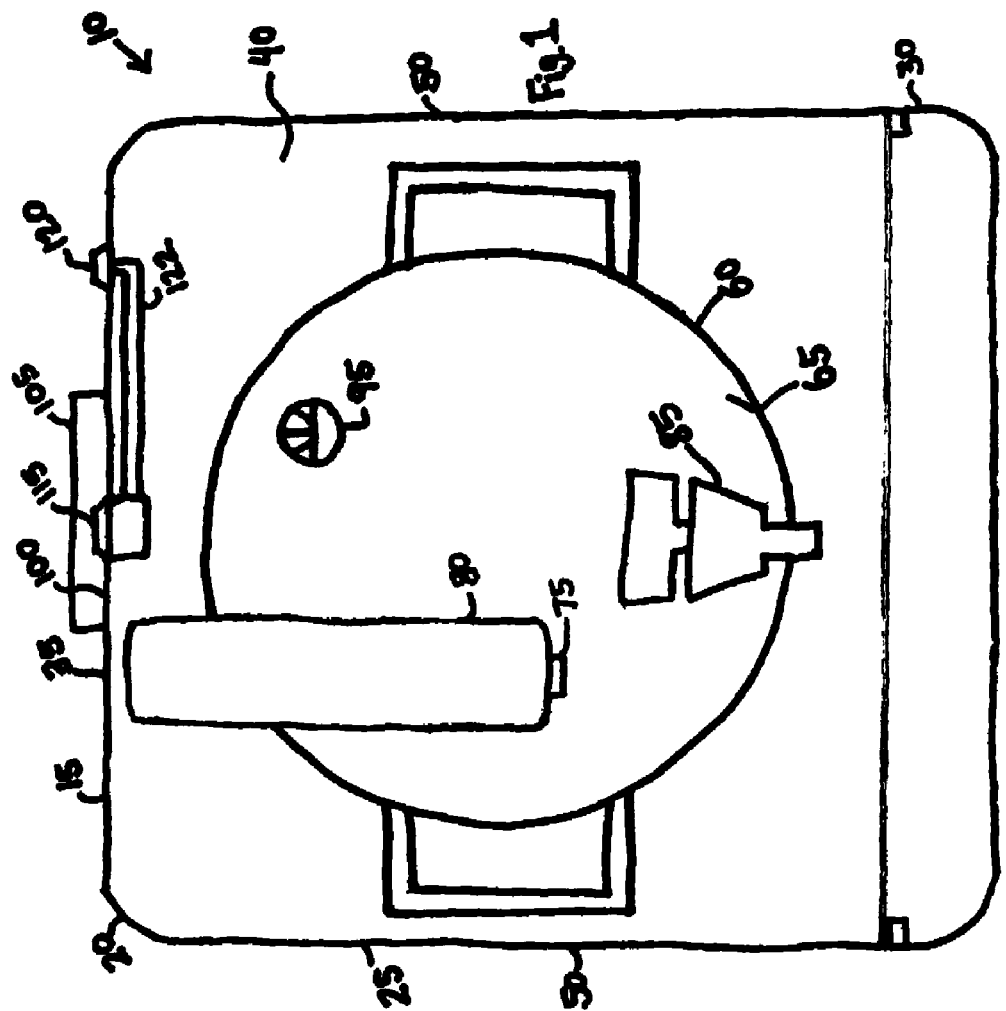
FIG. 1 is a front view on an embodiment of the apparatus for preparing beverages.
Figure 2:
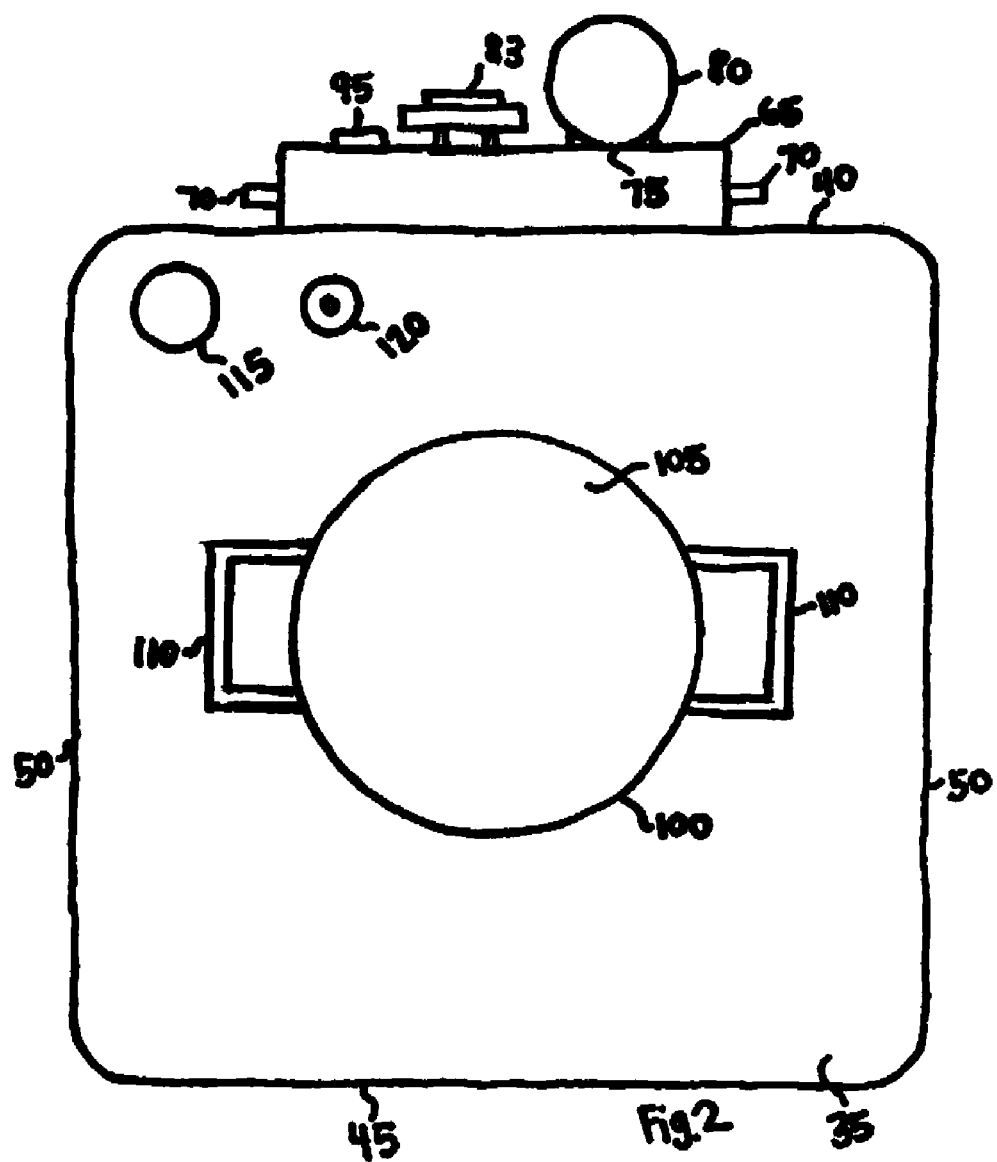
FIG. 2 is a top view of the apparatus for preparing beverages.
Figure 3:
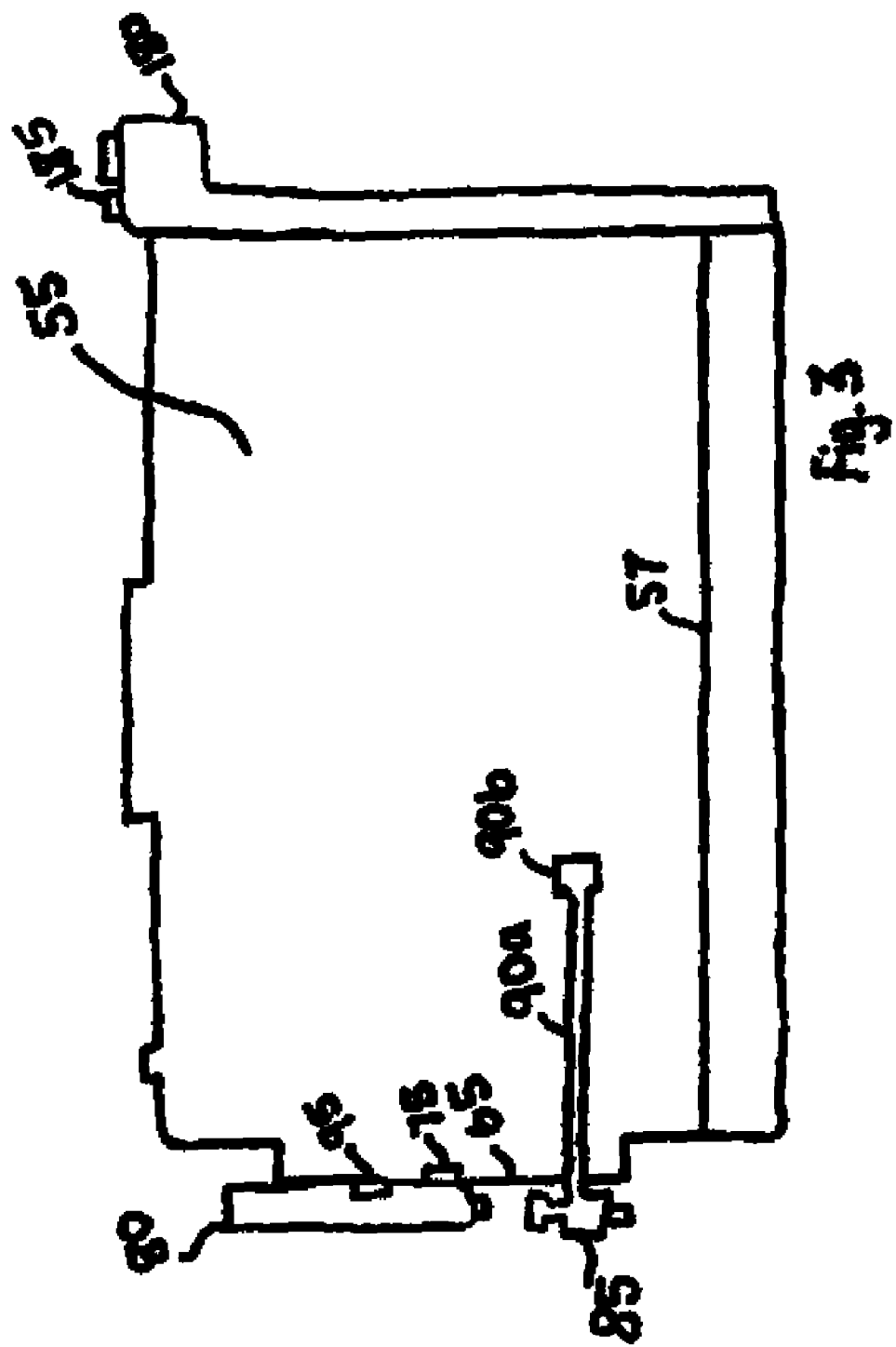
FIG. 3 is a partial sectional view from a side of the apparatus for preparing beverages.

The figures are not intended to be exhaustive or to limit the invention to the precise form disclosed. It should be understood that the invention can be practiced with modification and alteration, and that the invention be limited only by the claims and the equivalents thereof.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

The present invention is directed toward an apparatus for preparing a beverage. In one embodiment, referring to FIGS. 1-5, the apparatus for preparing a beverage 10 is configured to serve as a beverage making appliance in a home, or in a non-commercial environment. The appliance 10 has a frame 15 in the general shape of a rectangular solid having rounded corners 20 and edges 25. In one example, the frame has dimensions of 15 inches in height, 13 inches in width and 20 inches in length. The frame has a base 30, a top 35, front 40 and back 45 sides and right and left sides 50. On the base 30 of the appliance are four aluminum legs 51 with rubber pads at the bottom of each leg 51. Located inside the right and left sides 50 of the frame is a cooling element 52, and inside the base is a heating element 54. In one embodiment, the heating element 54 is 19 inches long and 12 inches wide and the cooling element 52 is 19 inches long and 14 inches high and both 52, 54 are covered by a layer of aluminum.

A beverage chamber 55 is disposed inside the frame 15. The interior of chamber 55 is smooth and flat and may be made of food grade aluminum. The walls surrounding the beverage chamber are hollow to allow the placement of and access for maintenance of the heating 54 and cooling 52 elements. The heating 54 and cooling elements 52 cannot be seen from the inside of the beverage chamber 55 as they are inside the wall of the chamber 55. The thickness of the walls provides some insulation to both heat and cold from being transferred to the outside environment of the appliance 10. A wire mesh screen 57 may be disposed in the bottom of the chamber 55 to prevent a float 90b (discussed below) from contacting yeast or other particles. In one embodiment, the wire mesh screen 57 is removable and is located 3 inches above the heating element 52.

On the front side 40 of the appliance 10 is a first opening 60 that is closeable and may be hermetically sealed by a circular first cover 65. The first opening 60 may be circular and leads into the beverage chamber 55. The cover may include a pair of handles 70 extending outward from a side of the cover 65. In one embodiment, the first opening 60 is six and one half inches in diameter and located in the center of the front side 40. The first opening 60 and cover 65 may be threaded to allow for ease of screwing and unscrewing of the cover 65.

In another embodiment, disposed in the first cover 65 is a gas valve 75, connectable to a $CO_2$ bulb or cartridge 80. The gas valve may have a toggle biased in a closed position. The gas valve 75 is contiguous with the beverage chamber 55 so that when a $CO_2$ bulb 80 is attached, an operator may toggle the valve to inject pressurized $CO_2$ gas into the chamber 55. Also disposed in the first cover 65 is a spigot 85 for dispensing liquid out of the beverage chamber 55. A dispensing tube 90a and float 90b are connected to the spigot and extends into the beverage chamber 55. A pressure gauge 95 may be also disposed in the cover for displaying a pressure reading of the gas pressure inside the beverage chamber 55. The first cover 65 is removable to provide for ease of cleaning the inside of the chamber 55. Since, the various components of the appliance 10 (gas valve 75, spigot 85 etc.) may be disposed in the removeable first cover, these components are easily replaceable by an end user should any of them fail. An end user would merely have to replace the first cover 65 with a replacement cover 65, and since the cover 65 is designed to be removable by the end user/operator, no technical skill would be required to use the replacement cover 65.

In a further embodiment, a second opening 100 that leads into the beverage chamber 55 is disposed in a top 35 of the frame 15 for placing ingredients and liquids into the beverage chamber 55. In a preferred embodiment, the second opening 100 has the same dimensions as the first opening and is centered in the top 35 of the frame 15. The second opening 100 has a second cover 105 having handles 110 extending outward from a side of the cover 105. The second cover 105 forms a hermetic seal when the second cover 105 is placed on the second opening 100, so that air and liquid do not escape.

The top 35 may also include a pressure release valve 115 and a pressure release toggle button 120 for opening and closing the pressure release valve. 115. The release valve 115 may be disposed near a corner 20 of the frame and is contiguous with the beverage chamber 55 for releasing gas pressure from the chamber 55. In one embodiment, a pressure release stem 122 connects the pressure release button 120 to the release valve 115 and is disposed inside the beverage chamber 55.

Figure 9:
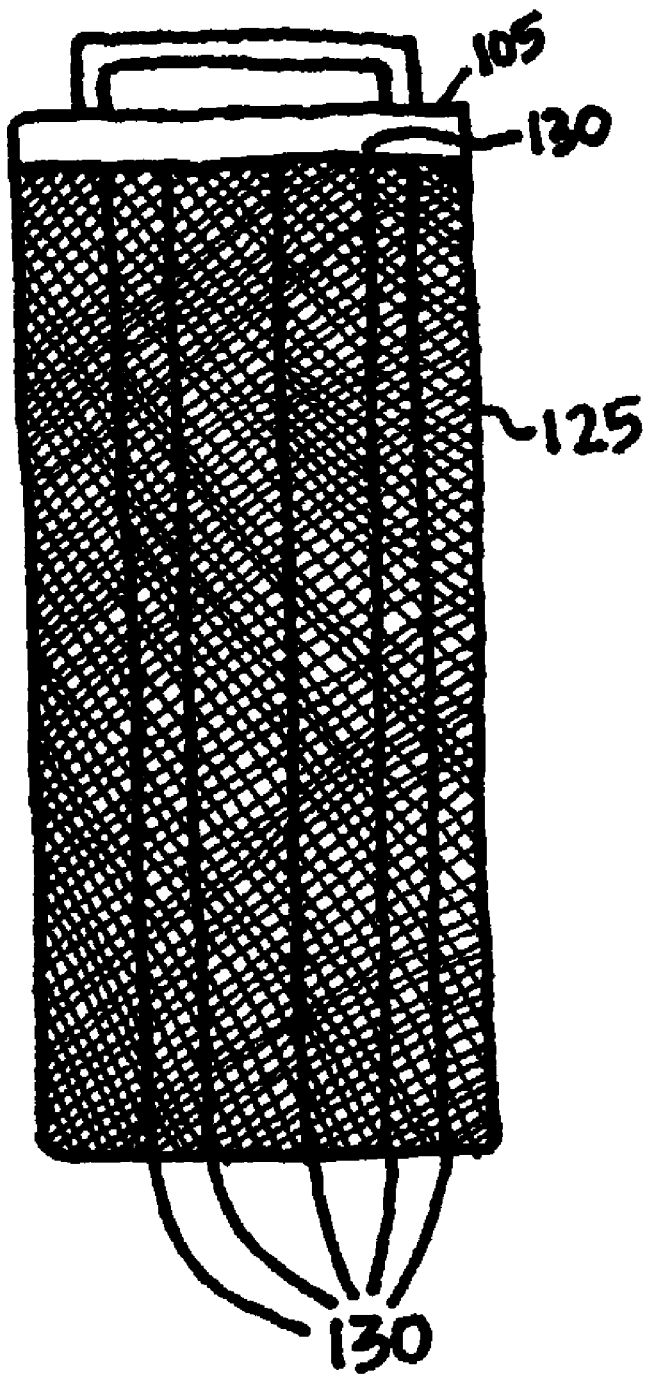
FIG. 9 is a side view of a steeping chamber for the apparatus for preparing beverages.

In still another embodiment, referring to FIGS. 9-11, the appliance 10 may include a steeping chamber 125. The steeping chamber 125 may be constructed of finely woven food grade aluminum or stainless steel and reinforced with six rods 130 from top 135 to bottom 140 of the chamber 125. The bottom is also woven so that liquid may pass through into the chamber 125 but preclude passage of larger particles, such as tea leaves. In one example, the chamber 125 is 13½ inches long. Referring to FIGS. 10 and 11, the chamber 125 may be configured to connect to the second cover 105 and suspend into the beverage chamber 55 through the second opening 100. In one embodiment, the steeping chamber 125 and the second cover 105 may connect via corresponding threads 145. The steeping chamber may be used for brewing coffee, tea and also for steeping different ingredients into beverages such as fresh ginger root to make ginger ale.

Figure 4:
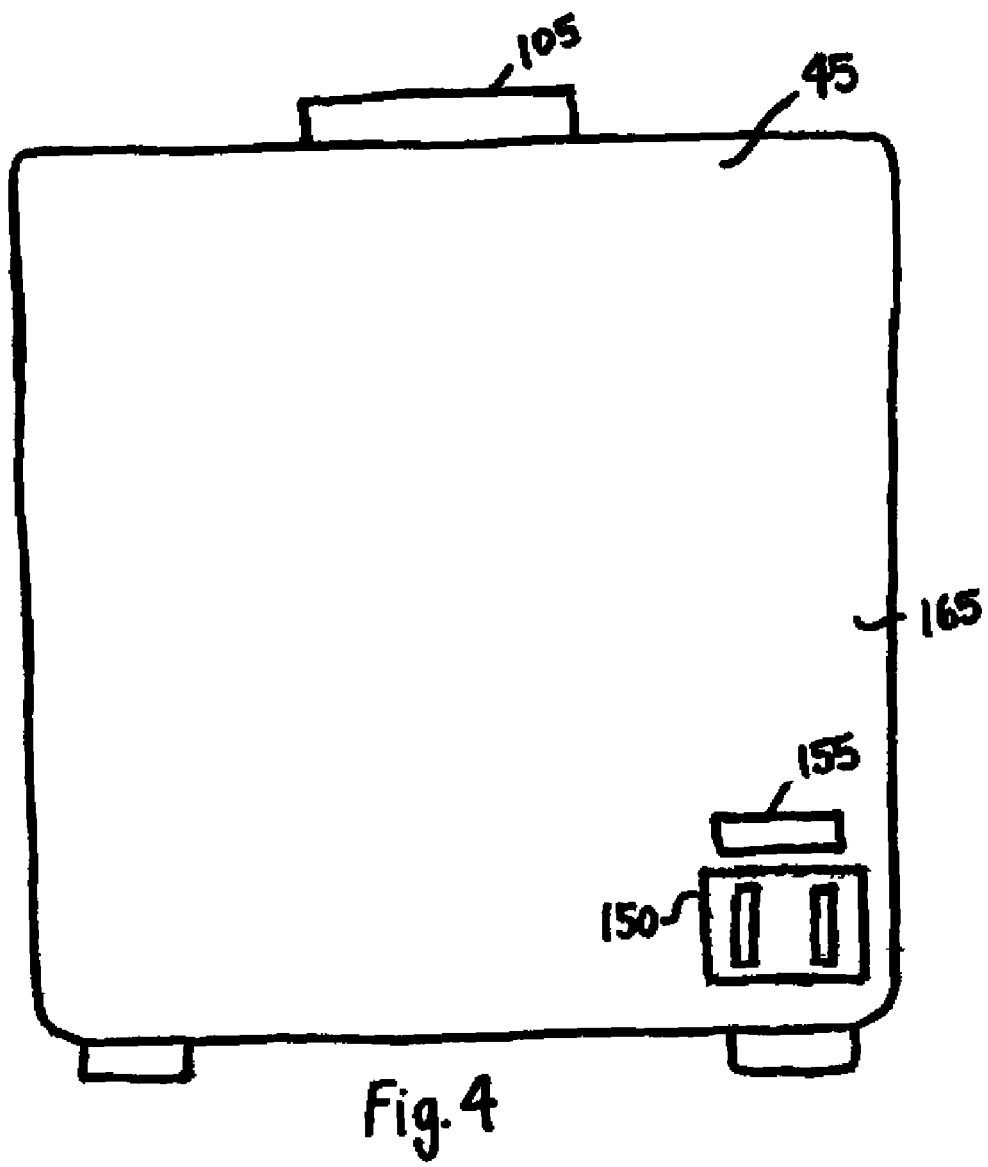
FIG. 4 is back view of the apparatus for preparing beverages.
Figure 5:
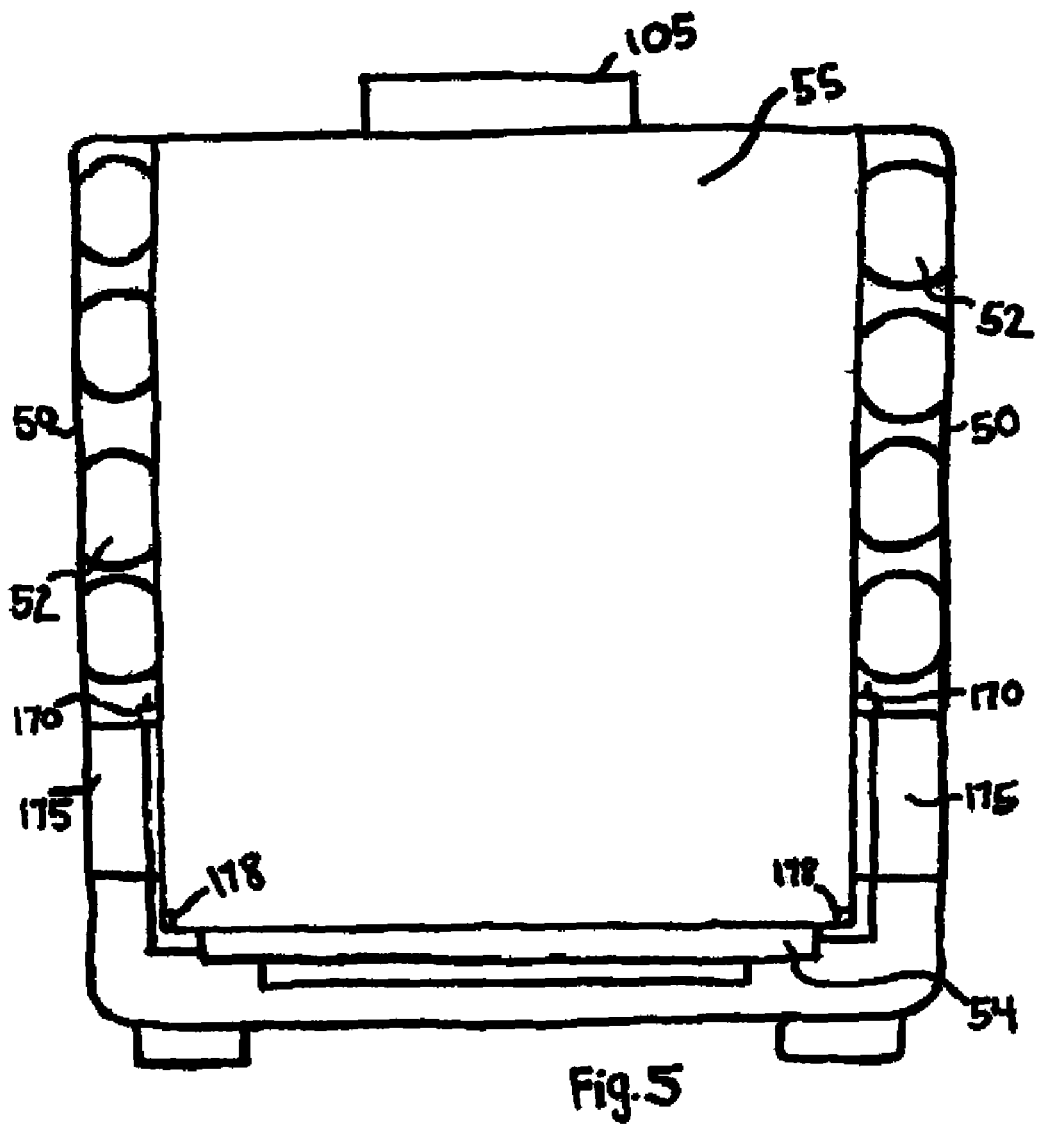
FIG. 5 is a partial sectional view from the back of the apparatus for preparing beverages.

In yet a further embodiment, referring to FIGS. 4 and 5, the back side 45 of the appliance 10 includes power receptacle 150 for plugging in a power cord and supplying power to the appliance and an on/off switch 155. The back side 45 may include a removable back cover 165 to permit maintenance of the various components and systems housed inside the walls of the appliance, for example the cooling element 52 and for removing the heating element 54. The cooling element 50 may be disposed inside both side walls 50 and may comprise refrigeration coils 52. Below the coils 52 are temperature sensors 170 that are located above a heat shield 175 for thermally insulating the heating 54 and cooling 52 elements from each other. The cooling element 52 functions to keep the beverage chamber cold and cool its contents. The heating element 54 functions to heat beverages to the required or desired temperature. Inside the bottom of the chamber 55 near the corners are liquid sensors 178. The liquid sensors 178 prevent the machine from having the heating or refrigeration controls turned on while the machine is empty. In one embodiment, heating and cooling controls 180 are located on the back side 45 of the appliance 10 and may include a power light indicator 185.

Figure 6:
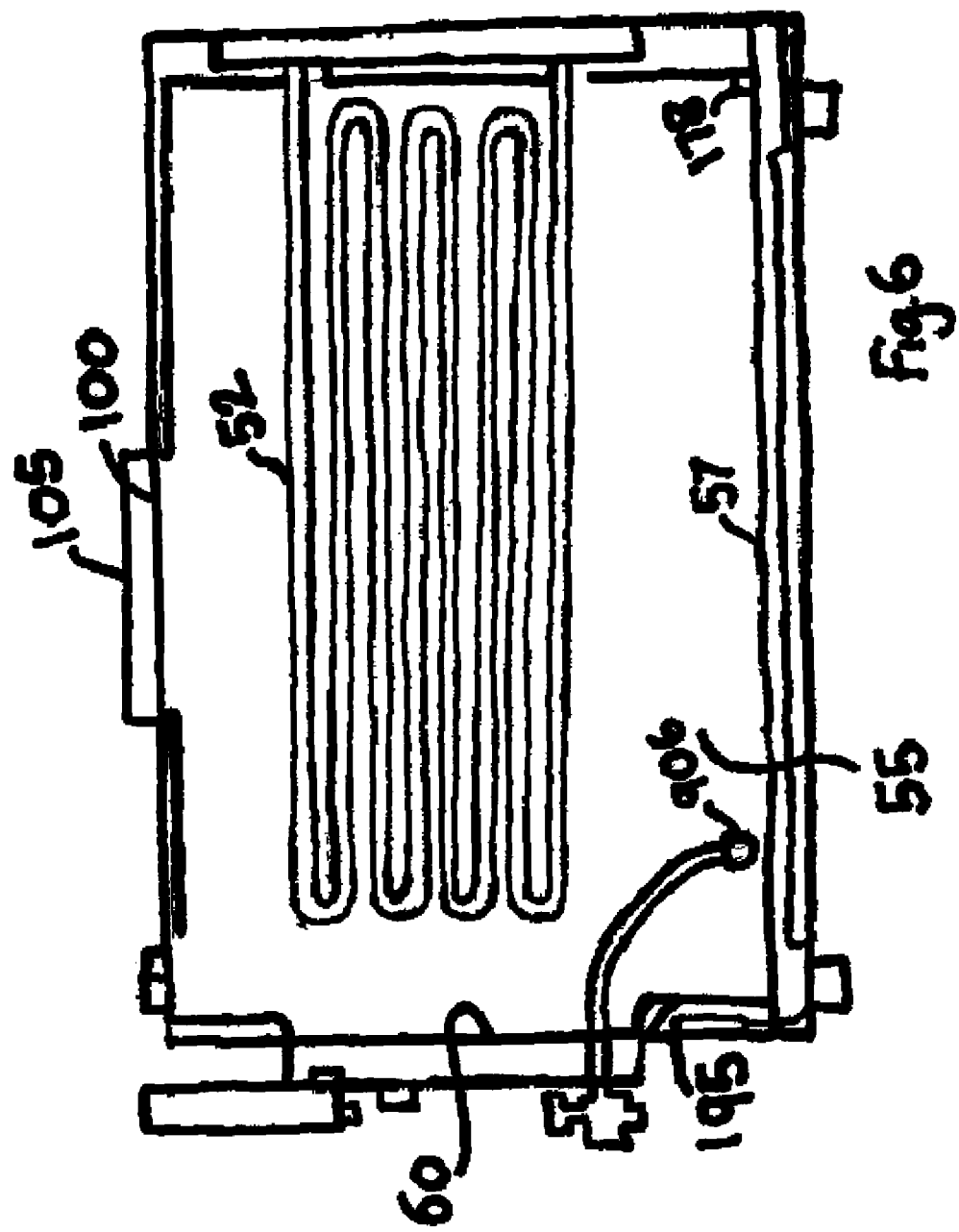
FIG. 6 is a partial sectional view from a side of a preferred embodiment of the apparatus for preparing beverages.

In a preferred embodiment, referring to FIGS. 6 and 7, the appliance 10 includes a control panel 190 having an LCD display 195 and buttons 198 on the front side 40 of the appliance 10, below the spigot 85. The control panel 190 may be 6 inches long by 2½ inches high and is flush with the front 40 of the appliance 10. Adjacent the buttons 198, a top portion of the LCD display 195 shows brewing time in Days, Hours, and Minutes. The lower half of the screen may display a temperature of the chamber 55.

Figure 8:
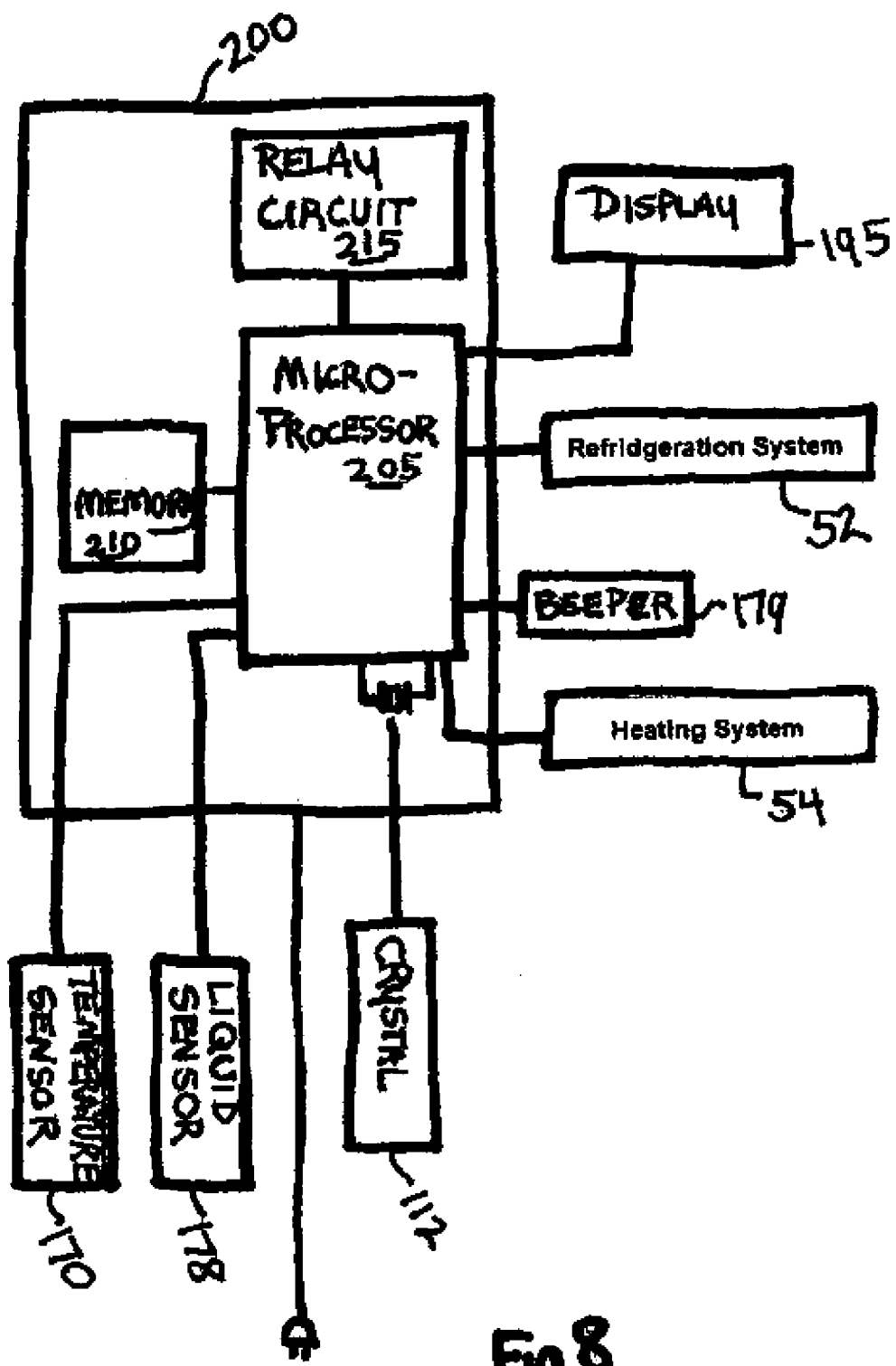
FIG. 8 is a block diagram of a control system of the apparatus for preparing beverages.

Referring to FIG. 8, the control panel 190 may house a circuit board 200, microprocessor 205, memory chip 210, fail safe circuitry, crystal oscillator 112, switches and relays 215. The crystal oscillator 112 provides a clock rate for the microprocessor, allowing an internal clock to keep real time. In one embodiment, the processor is electrical communication with the refrigeration system 52, heating system 54, liquid sensors 178, temperature sensors 170 and a audio device such as a beeper 179. In one example, the processor is configured to prevent either the heating system 54 or refrigeration system 52 from operating if the other is active. In one embodiment, the appliance 10 is configured to receive feedback from the temperature sensors 170 in order to prevent the appliance from being operated with both the heating 54 and cooling 52 elements turned on at the same time. This is a part of a fail safe system to prevent hazards, wear on the appliance, and/or wasted energy. In another example, the processor precludes either the systems 52, 54 from operating if the liquid sensor 178 detects no liquid in the chamber 55.

Figure 7:
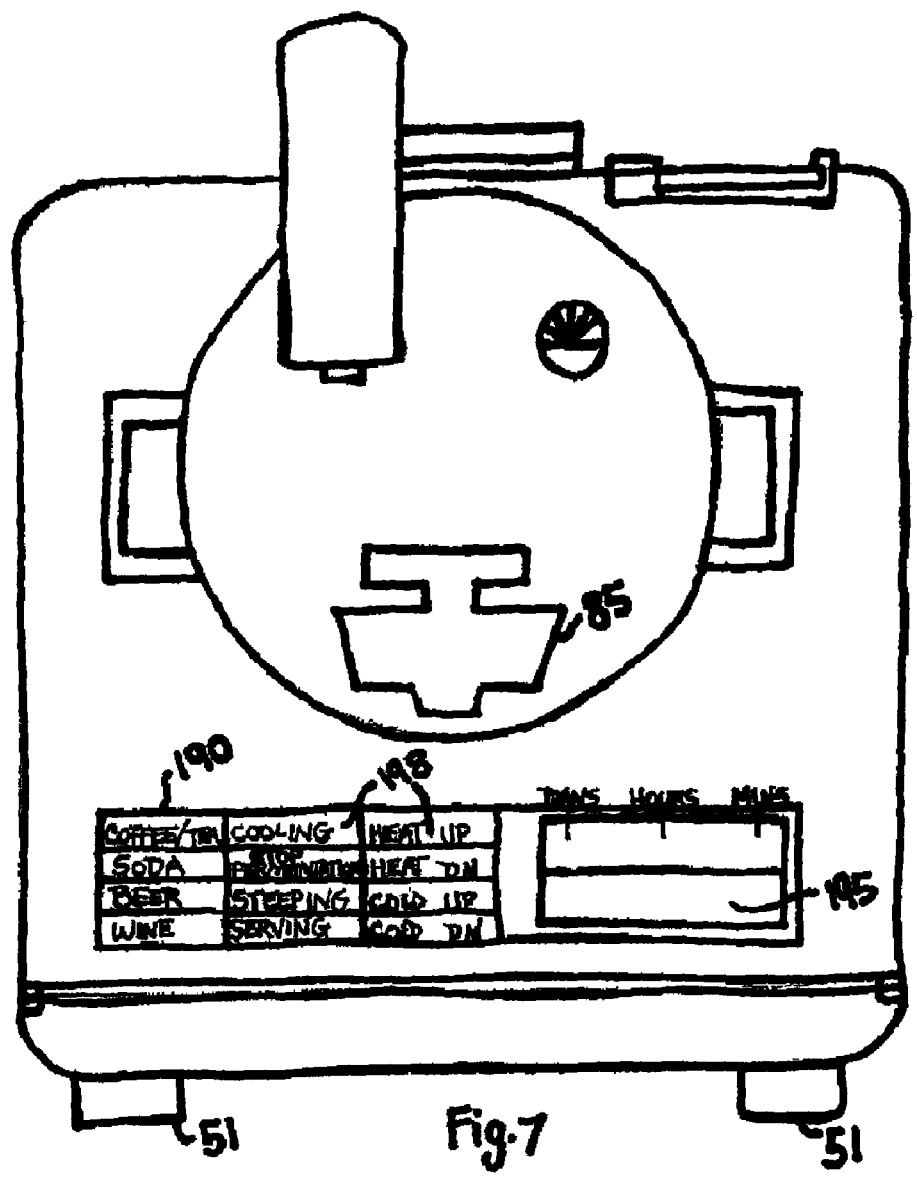
FIG. 7 is a front view of a preferred embodiment of the apparatus for preparing beverages.

In another embodiment, a first set of buttons 198 on the panel 190 is pre-set heating controls for heating ingredients to the desired temperature for brewing different beverages, labeled in FIG. 7 as: 1. Coffee/Tea, 2. Soda, 3. Beer, and 4. Wine. A second set of buttons 198 is pre-set cooling and heating temperatures, labeled: 1. Cooling, 2. Steeping, 3. Stop Fermentation and 4. Serving. The cooling pre-set button operates the appliance 10 for quickly cooling the beverage to yeast pitching temperatures. The steeping pre-set button operates the appliance for brewing coffees, teas, and/or steeping different ingredients such as malt, hops and other spices for flavoring. The stop fermentation pre-set button operates the appliance 10 for dropping the temperature of the beverage to kill the yeast which stops fermentation. The serving pre-set button operates the appliance 10 for serving hot or cold beverages depending on which beverage setting is chosen (coffee=hot/cold, tea=hot/cold, soda=cold and beer=warm/cold). Another set of buttons comprise heating and cooling controls labeled: 1. Heat Up, 2. Heat Down, 3. Cold Up and 4. Cold Down. These controls adjust the pre-set controls to desired brewing settings in accordance with their respective labels.

In a further embodiment, the buttons 198 on the panel 190 operate the appliance as follows:

Coffee/Tea: Pressing this button causes the appliance 10 to operate the chamber 55 at pre-set coffee and tea temperatures. Pressing the button repeatedly will cycle through the various temperature settings for brewing coffees and teas. Temperatures range from 90 degrees to 212 degrees Fahrenheit.

Soda: Pressing this button causes the appliance 10 to operate the chamber 55 at pre-set soda brewing temperatures. Pressing the button repeatedly will cycle through the various temperatures settings for brewing sodas. Temperatures range from 90 degrees to 110 degrees Fahrenheit.

Beer: Pressing this button causes the appliance 10 to operate the chamber 55 at pre-set beer temperatures. Pressing the button repeatedly will cycle through the various temperature settings for brewing beer. Temperatures range from 96 degrees to 102 degrees Fahrenheit.

Wine: Pressing this button causes the appliance 10 to operate the chamber 55 at pre-set wine brewing temperatures. Pressing the button repeatedly will cycle through the various temperatures settings for brewing wine. Temperatures range from 90 degrees to 195 degrees Fahrenheit.

Cooling: Pressing this button causes the appliance 10 to operate the chamber 55 at a pre-set cooling temperature. Pressing the button repeatedly will cycle through the various temperatures for cooling wort, mash, soda base and any other ingredients that need cooling before pitching yeast. Temperatures range from 55 degrees to 77 degrees Celsius.

Stop Fermentation: Pressing this button will initiate the appliance to engage in a pre-set fermentation stopping process whereby the temperature is set to 20 degrees Celsius. Pressing the button a second time will end the stop fermentation cooling process.

Steeping: Pressing this button causes the appliance 10 to operate the chamber 55 at pre-set steeping temperatures. Pressing the button repeatedly will cycle through the various temperature settings for steeping coffees, teas, and other ingredients. Temperatures range from 96 degrees to 212 degrees Fahrenheit.

Serving: Pressing this button causes the appliance 10 to operate the chamber 55 at pre-set serving temperatures. Pressing the button repeatedly will cycle through the various temperature setting for serving coffee, tea, soda, beer, wine, and wine coolers. Temperatures range from 39 degrees Fahrenheit/3 degrees Celsius to 175 degrees Fahrenheit/80 degrees Celsius.

Heat Up: Pressing this button will increase the heat to preferred settings of the operator's choice. Pressing the button repeatedly will increase the heat in increments of 4 degrees Fahrenheit until 212 degrees Fahrenheit is achieved.

Heat Down: Pressing this button will decrease the heat to preferred settings of the operator's choice. Pressing the button repeatedly will decrease the heat in increments of 4 degrees Fahrenheit until 4 degrees Fahrenheit is achieved.

Cold Up: Pressing this button will increase the cooling temperature to preferred settings of the operator's choice. Pressing the button repeatedly will increase the cold in increments of 4 degrees Celsius until 4 degrees Celsius is achieved.

Cold Down: Pressing this button will decrease the cooling temperature to preferred settings of the operator's choice. Pressing the button repeatedly will decrease the cold in increments of 4 degrees Celsius until 19 degrees Celsius is achieved.

In yet a further embodiment, referring to FIGS. 12 and 13, a beverage caddie 220 is provided. The caddie 220 may comprise beverage holding portion 225 and a handle portion 230. The caddie is sized and shaped to fit over the frame 15 of the appliance 10 so that the handle portion 230 rests on the top 35 of the appliance 10 and the beverage holding portions are disposed next to the sides 50 of the appliance 10.

In still another embodiment, referring to FIG. 14, a bottling tube 250 and dispensing cap 255 are provided. The tube 250 may be comprised of flexible plastic tubing approximately 12 to 20 inches in length that is configured to attach to the end of the spigot 85 and to the dispensing cap 255 at an opposite end. The dispensing cap 255 is removable from the bottling tube for cleaning. The dispensing cap 255 may be a molded rubber cap with openings at both ends. In one end of the cap 255 the bottling tube 250 is inserted and the other end fits over the mouth of standard beer, wine and soda bottles.

The beverage making appliance 10 can serve as a storage device for the beverages made therein. For example, the appliance's 10 cooling element 52 can provide for chilled storage of beverages.

Operation

When making wine coolers or wine the user may pour a half gallon to a gallon of water into the appliance 10 and turn on the heating element. The user may then pour in rice syrup or some other type fermentable sugar and begin stirring the sugar until it is completely dissolved. The user may place the mesh screen 57 inside the appliance 10. The user may add any type of desired juice, from four to four and a half gallons and re-heat the mixture to 100° F. for 10 minutes to break down the sugars in the juice. After 10 minutes, the user may begin letting the mixture cool to room temperature without using the cooling element 52. After room temperature is achieved the user may begin pitching the yeast (the user should not pitch the yeast while the mixture is still warm or hot, as this will kill the yeast), without stirring. The user may seal the appliance 10 and wait a minimum of 7 days before chilling (with the cooling element) for 24 to 48 hours and then serving. The chilling process will kill any remaining yeast, the colder the setting the quicker fermentation ceases. The longer one waits to chill and serve the wine cooler, the better the flavor and the higher the alcohol content. The user may wait 14 days to raise the alcohol content by as much as 3% to 5% depending on the type of yeast used. To make wine, use the above steps and omit chilling and serving. Bottle and place the beverage in a refrigerator uncorked for 72 hours and then taste test for remaining carbonation. If carbonation remains leave uncorked for another 24 hours and taste again.

When making beer using a no boil kit the user may pour a gallon of water into the appliance 10 and then add the no boil beer kit and do not stir, then add the rest of the water up to 4 gallons. The user may pitch the yeast and without stirring, and then immediately closing the second opening 100. The user may wait for a minimum of 7 days before chilling for another 7 days and serve.

When making soda the user may pour a gallon of water into the appliance 10 and turn on the heating element to bring the water to boiling. The user may add 2 cups of sugar, 2 cups of light natural honey, and flavor extract. Making sure that all sugars are dissolved, the user may allow the mixture to cool to room temperature without using the cooling element. At this point there are two options: 1. the user can pitch yeast and wait 12 hours before chilling for 12 hours and then serve; or 2. The user can use appliance 10 to carbonate and chill immediately and serve in 2½ hours or less.

When making coffee or tea the user may pour 1 gallon of water into the appliance 10 and turn the heating element to boil. The user may then take a handful of coffee or tea leaves and place it into a muslin steeping bag. The user may lower the bag into the boiling water and steep as required.

When carbonating non-carbonated beverages, the user may pour the beverage into the appliance 10 and begin using the $CO_2$ dispenser until the desired carbonation is achieved. Wait about 12 hours for the carbonation to completely go through the beverage.

The following steps may be performed using the appliance 10 in the process of steeping coffee or tea:
 1. Pour Water—into the machine
 2. Press Steeping Button
 3. Steeping LCD/on
 4. Liquid Sensor/on=yes go to step 5.=no shuts down machine 5. Temperature LCD/on
6. Heating Element/on
7. Wait—Beep Sound=temperature achieved
8. Pour Ingredients—into steeping chamber, screw chamber into machine
9. Timer LCD/on=countdown in minutes
10. Wait—Beep Sound=timer off
11. Remove Steeping Chamber—reseal with waterhole fill lid
12. Serving LCD/on—cycle to proper temperature
13. Wait—Beep Sound=temperature achieved
14. Serve Beverage=temperature remains constant unit machine is empty The following steps may be performed using the appliance 10 in the process of steeping arbitrary ingredients:
1. Pour Water—into the machine
2. Press Steeping Button
3. Steeping LCD/on
4. Liquid Sensor/on=yes go to step 5.=no shuts down machine
5. Temperature LCD/on
6. Heating Element/on
7. Wait—Beep Sound=temperature achieved
8. Pour Ingredients—into steeping chamber, screw chamber into machine
9. Timer LCD/on=countdown in minutes
10. Wait—Beep Sound=timer off
11. Remove Steeping Chamber—reseal with waterhole fill lid
12. Heating Element/off
13. Go To Next Step In Recipe—beer, wine or soda The following steps may be performed using the appliance 10 in the process of preparing beer or wine:
1. Pour Water—into the machine
2. Press Beer or Wine Button
3. Beer or Wine LCD on
4. Liquid Sensor on=yes go to step 5.=no shuts down machine
5. Temperature LCD on
6. Heating Element on
7. Wait—Beep Sound=temperature achieved
8. Pour Extra Ingredients—into steeping chamber, screw chamber into machine
9. Timer LCD on=countdown in minutes
10. Wait—Beep Sound=timer off
11. Heating Element off
12. Cooling LCD on
13. Cooling Element on
14. Remove Steeping Chamber—reseal with waterhole fill lid
15. Wait—Beep Sound—temperature achieved
16. Cooling LCD off
17. Cooling Element off
18. Pitch Yeast—unseal and pitch yeast into the machine
19. Start Timer—countdown in days, hours and minutes
20. Wait 14 days—Beep Sound—Timer off
21. Stop Fermentation LCD on
22. Cooling Element on
23. Wait—Beep Sound—temperature achieved
24. Timer LCD on=countdown in hours
25. Wait—Beep Sound—timer off
26. Stop Fermentation LCD off
27. Serving LCD on
28. Wait—Beep Sound—temperature achieved
29. Serve Beverage=temperature remains constant unit machine is empty The following steps may be performed using the appliance 10 in the process of preparing soda:
1. Pour Water—into the machine
2. Press Soda Button
3. Soda LCD/on
4. Liquid Sensor/on=yes go to step 5.=no shuts down machine
5. Temperature LCD/on
6. Heating Element/on
7. Wait—Beep Sound=temperature achieved
8. Pour Ingredients—into the machine
9. Timer LCD/on=countdown in hours
10. Wait—Beep Sound=timer off
11. Force Carbonate=push$_{CO2}$ button, one 6 second burst
12. Serving LCD/on—cycle to proper temperature
13. Wait—Beep Sound=temperature achieved
14. Serve Beverage=temperature remains constant unit machine is empty While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. An apparatus for preparing a beverage, comprising:
a frame having a base, a top, front and back sides, and right and left sides;
a beverage chamber disposed inside the frame;
a heating element connected to the frame;
a cooling element disposed inside the frame between the beverage chamber and the frame;
a gas valve connected to the frame and penetrating the frame to extend into the beverage chamber;
a heat shield disposed in a side of the frame; and
a spigot connected to the frame, the spigot having a channel contiguous with the beverage chamber for emptying the contents of the chamber.

2. The apparatus of claim 1, wherein the cooling element is disposed in the right and left sides; the heating element is disposed in base; and the spigot and gas valve are connected to the front side of the frame.

3. The apparatus of claim 1, wherein the gas valve is configured to receive and connect to a $CO_2$ bulb, the gas valve having a switch for toggling between an open position for permitting $CO_2$ to enter the beverage chamber and a closed position to maintain the $CO_2$ in the bulb.

4. The apparatus of claim 1, further comprising a steeping chamber sized and shaped to fit inside the beverage chamber.

5. The apparatus of claim 4, wherein the steeping chamber has sides comprised of wire mesh and a lid for sealing a closeable opening disposed in the top of the apparatus, the closeable opening leading into the beverage chamber and the lid sized and shaped to close off the first closeable opening.

6. The apparatus of claim 1, further comprising a pressure release valve disposed in the frame and contiguous with the beverage chamber for permitting the escape of gas from the beverage chamber when the valve is in an open position, and a pressure release toggle disposed in the frame, the pressure release toggle configured to open the pressure release valve when operated on by a user, wherein the pressure release valve and the pressure release toggle are biased in a closed position.

7. An apparatus for preparing a beverage, comprising:
a frame having a base, a top, front and back sides, and right and left sides;
a beverage chamber disposed inside the frame;
a heating element connected to the frame;
a cooling element disposed inside the frame between the beverage chamber and the frame;
a gas valve connected to the frame and penetrating the frame to extend into the beverage chamber;
a spigot connected to the frame, the spigot having a channel contiguous with the beverage chamber for emptying the contents of the chamber;
a first closeable opening disposed in the front, the first closeable opening leading into the beverage chamber;
a cover sized and shaped to hermetically seal the first closeable opening; and
wherein the gas valve and the spigot are disposed in the cover.

8. The apparatus of claim 1, further comprising:
a controller in electrical communication with the heating element and the cooling element; and
a temperature sensor disposed in a side wall, the temperature sensor in electrical communication with the controller;
wherein the controller configured to turn off the heating and cooling elements when the temperature sensor reaches a critical temperature.

9. The apparatus of claim 1, wherein the apparatus is configured to maintain a liquid in the beverage chamber at a predetermined temperature in response to an action by an operator of the apparatus.

10. The apparatus of claim 7, wherein the heating element is removable from the frame.

11. The apparatus of claim 7, further comprising a second closeable opening disposed in the top, the second closeable opening leading into the beverage chamber and a second cover sized and shaped to close off the second closeable opening.

12. The apparatus of claim 7, wherein the cooling element is disposed in the right and left sides; the heating element is disposed in base; and the spigot and gas valve are connected to the front side of the frame.

13. An apparatus for preparing a beverage, comprising:
a frame having a base, a top, front and back sides, and right and left sides;
a beverage chamber disposed inside the frame;
a heating element connected to the frame;
a cooling element disposed inside the frame between the beverage chamber and the frame;
a gas valve connected to the frame and penetrating the frame to extend into the beverage chamber;
a spigot connected to the frame, the spigot having a channel contiguous with the beverage chamber for emptying the contents of the chamber;
a dispensing tube connected to the spout;
a float connected to an end of the dispensing tube; and a screen disposed in the bottom of the beverage chamber, the screen configured to screen the float from the bottom of the beverage chamber.

14. The apparatus of claim 13, further comprising:
a controller in electrical communication with the heating element and the cooling element; and
a temperature sensor disposed in a side wall, the temperature sensor in electrical communication with the controller;
wherein the controller configured to turn off the heating and cooling elements when the temperature sensor reaches a critical temperature.

15. The apparatus of claim 13, further comprising a liquid sensor disposed inside the beverage chamber.

16. The apparatus of claim 13, further comprising a display and control panel connected to the outside of the frame.

17. The apparatus of claim 13, wherein the apparatus is configured to maintain a liquid in the beverage chamber at a predetermined temperature in response to an action by an operator of the apparatus.

18. The apparatus of claim 13, further comprising a beverage caddie sized and chapped to fit over the frame.

19. The apparatus of claim 13, wherein the cooling element is disposed in the right and left sides; the heating element is disposed in base; and the spigot and gas valve are connected to the front side of the frame.

20. The apparatus of claim 13, further comprising a steeping chamber sized and shaped to fit inside the beverage chamber.

* * * * *